United States Patent [19]

Yang et al.

[11] 4,405,595

[45] Sep. 20, 1983

[54] METHOD OF PRODUCING SPHERICAL LITHIUM ALUMINATE PARTICLES

[75] Inventors: Ling Yang, La Jolla; Russell R. Medico; Wesley A. Baugh, both of San Diego, all of Calif.

[73] Assignee: GA Technologies Inc., San Diego, Calif.

[21] Appl. No.: 339,697

[22] Filed: Jan. 15, 1982

[51] Int. Cl.$^3$ ............................................. C01F 7/04
[52] U.S. Cl. .................................................. 423/600
[58] Field of Search ......................... 423/600; 252/448

[56] References Cited

U.S. PATENT DOCUMENTS

| | | | |
|---|---|---|---|
| 2,422,172 | 6/1947 | Smith et al. | 190/50 |
| 2,454,227 | 11/1948 | Smith et al. | 252/434 |
| 2,474,440 | 6/1972 | Smith et al. | 260/683.3 |
| 3,346,336 | 10/1967 | Hayes | 23/143 |
| 3,654,186 | 4/1972 | Veseley | 252/465 |
| 3,998,939 | 12/1976 | Meson et al. | 423/600 |
| 4,164,557 | 8/1979 | Feldmann et al. | 423/600 |
| 4,347,327 | 8/1982 | Lee et al. | 423/157 |
| 4,348,297 | 9/1982 | Bauman et al. | |

*Primary Examiner*—Herbert T. Carter
*Attorney, Agent, or Firm*—Fitch, Even, Tabin & Flannery

[57] ABSTRACT

Spherical particles of lithium aluminate are formed by initially producing aluminum hydroxide spheroids, and immersing the spheroids in a lithium ion-containing solution to infuse lithium ions into the spheroids. The lithium-infused spheroids are rinsed to remove excess lithium ion from the surface, and the rinsed spheroids are soaked for a period of time in a liquid medium to remove water and $NH_4OH$ from their surfaces. The soaked spheroids are then dried and sintered to form lithium aluminate spherical particles.

16 Claims, No Drawings

METHOD OF PRODUCING SPHERICAL LITHIUM ALUMINATE PARTICLES

The present invention relates to the production of small mixed metal oxide spheroids and more particularly to the production of lithium aluminate spheroids.

BACKGROUND OF THE INVENTION

There is a need for small spherical particles high in lithium content. Such particles have applicability in nuclear reactors for breeding fusionable tritium ($^3$H) through capture by the lithium of free neutrons and may be employed in the core of a fission reactor or in a blanket region of a fusion reactor. For use in fission reactor cores where it is necessary to coat tritium breeding particles with a tritium impermeable shell lest the radioactivity of the circulating coolant rise to an intolerable level during reactor operation, spheroids represent the best configuration for uniform shell formation, e.g., with pyrocarbon and silicon carbide layers for containment of the bred tritium.

Spheroids of numerous metal oxides and mixed metal oxides have been produced by sol-gel or gel-supported precipitation methods. In a sol-gel method, the starting material is a colloidal dispersion (sol) of a compound in a liquid medium from which the compound can be turned into a gel form by dehydration or by changing the pH of the medium. In a gel-supported precipitation method, a starting material consists of a solution containing metal ions of the compound in a gelling medium from which the compound is precipitated in gel form by changing the pH value of the medium.

Spheroids produced by such methods have found use as catalyst supports, e.g., spheroids of alumina or mixed alumina-silicon oxides. Spheroids of uranium and thorium oxides are useful in nuclear reactors as nuclear fuel and for breeding fissionable material, respectively.

A particularly promising lithium-containing material for use in tritium breeding is lithium aluminate (LiAlO$_2$) which has a melting point greater than 1625° C. Heretofore, attempts to form spheroids of lithium aluminate by sol-gel or gel-supported precipitation methods have been unsuccessful. The sol-gel method is unsuitable for producing lithium aluminate spheroids due to the failure to produce a lithium aluminate sol. An attempt to prepare lithium aluminate spheroids by gel-supported precipitation using a feed solution of aluminum nitrate, lithium nitrate and polyvinyl alcohol has resulted in leaching of the lithium ions when the spheroids are washed with 3 weight percent aqueous NH$_4$OH solution to rid the spheroids of NH$_4$NO$_3$.

SUMMARY OF THE INVENTION

Spherical mixed oxides of aluminum and lithium, which are generally homogeneous and which have a generally 1:1 ratio of lithium to aluminum, are produced by the preliminary formation of aluminum hydroxide gel spheroids by conventional sol-gel method followed by lithium infusion into the spheroids achieved by immersing the spheroids in a lithium hydroxide solution. The spheroids are rinsed in aqueous NH$_4$OH solution which removes excess LiOH from the surfaces and soaked in isopropyl alcohol which removes water and NH$_4$OH from the surfaces of the spheroids. The lithium-infused gel spheroids are dried and sintered to produce lithium aluminate spheroids.

DETAILED DESCRIPTION OF THE PREFERRED EMBODIMENTS

In accordance with the present invention, the heretofore unachievable mass production of small spheroids of lithium aluminate is achieved through the formation of aluminum hydroxide spheroids and infusion of lithium into the spheroids from a lithium hydroxide solution in a controlled manner which maintains the spherical shape of the gel particles. Excess lithium hydroxide and water are removed from the surface of the infused spheroids, in a manner which prevents the spheroids from splitting or otherwise deforming, to provide lithium-infused gel spheroids. When the lithium-infused gel spheroids are dried and sintered, generally homogeneous spheroids of the mixed lithium aluminum oxide with up to a 1:1 atom ratio of lithium to aluminum result. The spheroids may be used directly in a fusion blanket for breeding tritium or may be outgassed and coated with a tritium-impermeable coating for breeding tritium in a fission reactor core.

Generally, an aluminum hydroxide sol is prepared, and droplets of the gel are dropped through an ammonia column to form gelled aluminum hydroxide spheroids. The small spheroids are washed with aqueous NH$_4$OH to remove extraneous substances therefrom and then drained. Where the aluminum hydroxide spheroids are formed from aluminum nitrate, about 3 weight percent aqueous ammonium-hydroxide solution is used to remove ammonium nitrate from the aluminum hydroxide spheroids. After draining, the washed particles are immersed in a lithium hydroxide solution of sufficient concentration and for a sufficient length of time to produce lithium-infused gel spheroids having up to 1:1 atom ratio of lithium to aluminum.

The lithium-loaded spheroids are rinsed with ammonium hydroxide to remove excess lithium hydroxide and further soaked in a liquid medium, e.g., isopropyl alcohol, for a period of time to remove water and NH$_4$OH from the surface of the spheroids. The soaked spheroids are then air-dried at moderate temperature, i.e., below about 200° C., and then sintered in air at high temperatures, i.e., between about 1000° C. and 1400° C. and preferably between about 1200° C. and about 1300° C., to form lithium aluminate spheroids. Outgassing of the spheroids may be carried out at high temperature under vacuum to produce spheroids for pyrolytic coating.

Presently, the above-described method is being used to produce spheroids in the 300 to 500 micron diameter range. The method is useful, however, for producing spheroids ranging in diameter from about 100 to about 1000 microns in size with a preferred diameter range of from 200 to 800 microns. The size of the sintered lithium aluminate spheroids is less than that of the gel spheroids from which they are formed, and depending on the particular conditions, the diameters of the hydrated gel spheroids are about a factor of two to three larger than that of the sintered lithium aluminate spheroids.

The degree of lithium ion infusion into the gel spheroids depends on the lithium ion concentration of the immersing solution as well as the immersion time. The immersion of the aluminum hydroxide spheroids in lithium hydroxide solution need be carried out only long enough to achieve the desired amount of lithium infusion. Gel spheroids of about 900 micron diameter immersed in 4.5 N LiOH for 3 hours become fully loaded, achieving a 1:1 lithium:aluminum atom ratio, and, thereafter, no further infusion of lithium occurs. Higher concentrations of LiOH will hasten lithium ion infusion, e.g., a 5N solution will fully load the gel spheroids with lithium ion in about 2½ hours. Leaving the spheroids in the gel for somewhat longer times has no adverse effect as gel spheroids immersed in a 5N solution for up to 16 hours maintain their spherical shape; however, longer immersion times may result in lithium hydroxide attack of the spheroid surface giving the particles a nonspherical or "marshmallow" shape. More concentrated solutions of LiOH are not necessary and tend to deform the spheroids. The volume of lithium ion-containing immersing solution should be at least three times the volume of the gel spheroids.

A smaller atom ratio of Li:Al may be achieved with less concentrated LiOH solutions or by soaking for shorter periods of time. For instance, immersion in 3N LiOH for 6 hours results in particles with a Li:Al ratio of 0.77:1.

Experience has shown that spherical lithium aluminate is achieved only if special care is exercised at certain steps of the procedure. In the step of removing excess lithium ions from the spheroid surfaces by rinsing in aqueous $NH_4OH$ solution, it is important to remove excess LiOH as fully as possible to prevent lumping of the particles after drying. Nevertheless, the washing in $NH_4OH$ must be achieved quickly lest the lithium ions in the spheroids be lost by diffusion into the rinsing liquid. For purposes of this invention, it is preferred that the rinsing be carried out for between five and sixty seconds and that a 28 weight percent aqueous $NH_4OH$ solution be used for rinsing; however, a solution having a $NH_4OH$ concentration as low as 10 weight percent may be used.

Care must also be exercised in soaking the spheroids in a liquid medium for removing water and $NH_4OH$ from their surfaces. Sufficient soaking time is important because it is found that if the particles are not sufficiently soaked, they lose their spherical shape upon drying and have lumpy surfaces. With sufficient soaking, however, the dried particles remain spherical having relatively smooth surfaces. For purposes of this invention, soaking the spheroids should be carried out for at least about 20 minutes at temperatures above about 50° C. in isopropyl alcohol limiting.

The process will now be described in greater detail by way of a specific example.

EXAMPLE

An aluminum hydroxide sol having a viscosity of 138 centipoise at 23° C. and a pH of 3.85 is prepared from aluminum nitrate. The sol is caused to flow at 11.2 ml/min. through a 363 micron diameter nozzle vibrated at 518 Hertz from where the emerging particles are dropped through a one meter gaseous ammonia column into 28 weight percent aqueous $NH_4OH$. Gelled aluminum hydroxide spheroids are formed in the ammonium hydroxide having a generally uniform diameter of about 885 microns.

The gelled spheroids are let to stand in the ammonium hydroxide solution for about an hour and are then transferred to a stainless steel wire mesh basket and washed in 3 weight percent aqueous $NH_4OH$ to remove residual $NH_4NO_3$. Washing is continued until the electrical conductivity of the used washing solution is the same as that of the 3 weight percent aqueous $NH_4OH$, indicating complete removal of ammonium nitrate. The basket containing the washed spheroids is removed from the washing solution allowing the washing solution to drain from the spheroids.

The washed spheroids are then introduced into a polyethylene jar with a 5N LiOH solution at a volume of 5 parts of LiOH and 1 part of spheroids. The jar is sealed, held horizontally and rotated intermittently at a schedule of 15 minutes off and 2 minutes on at a rotation speed of 2 rpm, for a total of 16 hours. Complete infusion of lithium into the spheroids is achieved providing a 1:1 atom ratio of lithium to aluminum.

The lithium loaded spheroids are again put into a stainless steel wire mesh basket allowing the excess LiOH solution to drain. To remove residual surface LiOH, the spheroids are rinsed for 10 seconds in 28 weight percent aqueous $NH_4OH$. The spheroids are then rinsed three times in isopropyl alcohol to remove water and $NH_4OH$ on the surfaces of the particles and then soaked in isopropyl alcohol at 78°-80° C. for 40 minutes. To evaporate water and isopropyl alcohol, the spheroids are dried first in air at room temperature and then in an oven at 110° C.

The dried spheroids are laid on a bed of lithium aluminate powder contained in an alumina tray lined with Pt 10% Rh sheet and sintered in air at 1250° C. for four hours to form lithium aluminate spheroids. The sintered spheroids are packed in lithium aluminate powder in a covered Pt crucible and outgassed in a vacuum of less than $10^{-4}$ mm Hg at 1500° C. for one hour, thereby insuring no further outgassing if the particles are later coated with pyrocarbon and silicon carbide at high temperatures, e.g., 1300°-1500° C. The lithium aluminate spheroids have a density of 85% of theoretical value. The atom ratio of lithium to aluminum is determined to be 1:1. The spheroids have an average diameter of 350 microns with 95% of the spheroid between 300 and 400 microns in diameter.

The method of the present invention provides particles uniform in lithium content with well defined spherical shape, attributes particularly desirable for use as tritium breeding particles. The spherical particles have a generally uniform diameter which is determined by the nozzle size used in forming the gel spheroids.

While the invention has been described in terms of certain preferred embodiments, modifications obvious to one with ordinary skill in the art may be made without departing from the scope of the invention. For example, while it is preferred that the infusion of lithium into the aluminum hydroxide spheroids be achieved with a straight solution of lithium hydroxide which introduces no extraneous anions into the spheroids, other lithium ion-containing solutions may be used providing the pH is proper, and providing that significant amounts of other anions are not infused into the spheroids. The liquid medium in which the lithium-infused gel spheroids are soaked might be another organic solvent or mixtures of organic solvent rather than isopropyl alcohol.

Various features of the invention are set forth in the following claims.

What is claimed is:
1. A method of forming lithium aluminate spheroids comprising:
   forming aluminum hydroxide gel spheroids,
   washing the gel spheroids with an aqueous solution to rid said spheroids of extraneous substances,
   immersing said aluminum hydroxide gel spheroids in a solution of between about 3N and about 5N LiOH to infuse lithium ions into said gel spheroids, rinsing said lithium-infused gel spheroids in an aqueous solution of between about 10 and about 28 weight percent ammonium hydroxide for about 5 to about 60 seconds to remove excess lithium ion from the surface thereof, soaking said lithium-infused gel spheroids in an organic liquid to remove said aqueous ammonium hydroxide solution, drying said lithium-infused gel spheroids, and sintering said lithium-infused gel spheroids at a temperature of between about 1000° C. and about 1400° C. to form lithium aluminate spheroids.

2. A method according to claim 1 wherein said liquid medium is isopropyl alcohol.

3. A method in accordance with claim 1 wherein said lithium aluminate spheroids are between about 100 and about 1000 microns in diameter.

4. A method in accordance with claim 1 wherein said lithium aluminate spheroids are between about 200 and about 800 microns in diameter.

5. A method according to claim 1 wherein said aluminum hydroxide gel spheroids are formed from aluminum nitrate and said aluminum hydroxide spheroids are washed in about 3 weight percent aqueous ammonium hydroxide to rid the spheroids of ammonium nitrate.

6. A method of forming lithium aluminate spheroids comprising:

forming aluminum hydroxide gel spheroids, washing the gel spheroids with aqueous solution to rid said spheroids of extraneous substances, immersing said aluminum hydroxide gel spheroids in a solution of between about 3N and about 5N LiOH to infuse lithium ions into said gel spheroids, rinsing said lithium-infused gel spheroids in an aqueous ammonium hydroxide solution to remove excess lithium ion from the surface thereof, soaking said lithium-infused gel spheroids in an organic liquid to remove said aqueous solution, drying said lithium-infused gel spheroids, and sintering said lithium-infused gel spheroids at a temperature of between about 1000° C. and about 1400° C. to form lithium aluminate spheroids.

7. A method according to claim 6 wherein said aqueous solution, in which lithium-infused gel spheres are rinsed, is between about 10 and about 28 weight percent ammonium hydroxide solution.

8. A method according to claim 6 wherein said lithium-infused gel spheroids are soaked in said organic liquid for at least about 20 minutes at a temperature above about 50° C.

9. A method in accordance with claim 6 wherein said lithium aluminate spheroids are between about 100 and about 1000 microns in diameter.

10. A method in accordance with claim 6 wherein said lithium aluminate spheroids are between about 200 and about 800 microns in diameter.

11. A method according to claim 6 wherein said aluminum hydroxide gel spheroids are formed from aluminum nitrate and said aluminum hydroxide spheroids are washed in about 3 weight percent aqueous ammonium hydroxide to rid the spheroids of ammonium nitrate.

12. A method of forming lithium aluminate spheroids comprising:

forming aluminum hydroxide gel spheroids, washing the gel spheroids with an aqueous ammonium hydroxide solution to rid said spheroids of extraneous substances, immersing said aluminum hydroxide gel spheroids in a solution of between about 3N and about 5N LiOH to infuse lithium ions into said gel spheroids, rinsing said lithium-infused gel spheroids in an aqueous ammonium hydroxide solution to remove excess lithium ion from the surface thereof, soaking said lithium-infused gel spheroids in isopropyl alcohol to remove said aqueous solution, drying said lithium-infused gel spheroids, and sintering said lithium-infused gel spheroids at a temperature of between about 1000° C. and about 1400° C. to form lithium aluminate spheroids.

13. A method according to claim 12 wherein said lithium-infused gel spheroids are soaked in said isopropyl alcohol for at least about 20 minutes at a temperature above about 50° C.

14. A method in accordance with claim 12 wherein said lithium aluminate spheroids are between about 100 and about 1000 microns in diameter.

15. A method in accordance with claim 12 wherein said lithium aluminate spheroids are between about 200 and about 800 microns in diameter.

16. A method according to claim 12 wherein said aluminum hydroxide gel spheroids are formed from aluminum nitrate and said aluminum hydroxide spheroids are washed in about 3 weight percent aqueous ammonium hydroxide to rid the spheroids of ammonium nitrate.

* * * * *